United States Patent [19]

Brown et al.

[11] Patent Number: 4,972,472

[45] Date of Patent: Nov. 20, 1990

[54] METHOD AND APPARATUS FOR CHANGING THE MASTER KEY IN A CRYPTOGRAPHIC SYSTEM

[75] Inventors: Scott K. Brown, San Jose; Robert H. Hoem, Fremont, both of Calif.

[73] Assignee: Tandem Computers Incorporated, Cupertino, Calif.

[21] Appl. No.: 712,579

[22] Filed: Mar. 15, 1985

[51] Int. Cl.$^5$ .............................................. H04K 1/00
[52] U.S. Cl. ...................................... 380/21; 380/23; 380/24
[58] Field of Search .......................... 178/22.08, 22.09; 364/900; 380/23, 25, 24, 21

[56] References Cited

U.S. PATENT DOCUMENTS

| | | | |
|---|---|---|---|
| Re. 29,259 | 6/1977 | Sabsay | 235/382.5 |
| 4,386,234 | 5/1983 | Ehrsam et al. | 178/22.09 |
| 4,464,732 | 8/1984 | Clark | 364/900 |
| 4,558,175 | 12/1985 | Genest et al. | 178/22.08 |
| 4,578,531 | 3/1986 | Everhart et al. | 178/22.08 |
| 4,605,820 | 8/1986 | Campbell, Jr. | 178/22.09 |

OTHER PUBLICATIONS

"PIN Manual" Interbank Card Association, Printed 1980.

*Primary Examiner*—Salvatore Cangialosi
*Attorney, Agent, or Firm*—Townsend and Townsend

[57] ABSTRACT

A method and apparatus for changing the key in a cryptographic system or device are disclosed. A memory contains three storage areas for pending, active, and retired keys. New keys are loaded into the pending storage area. The key is changed by shifting the pending key into the active storage area and shifting the active key into the retired area for use by applications which have not been made aware of the key change. When an application presents a retired key, use of the retired key is allowed and the new key is returned to the application.

6 Claims, 3 Drawing Sheets

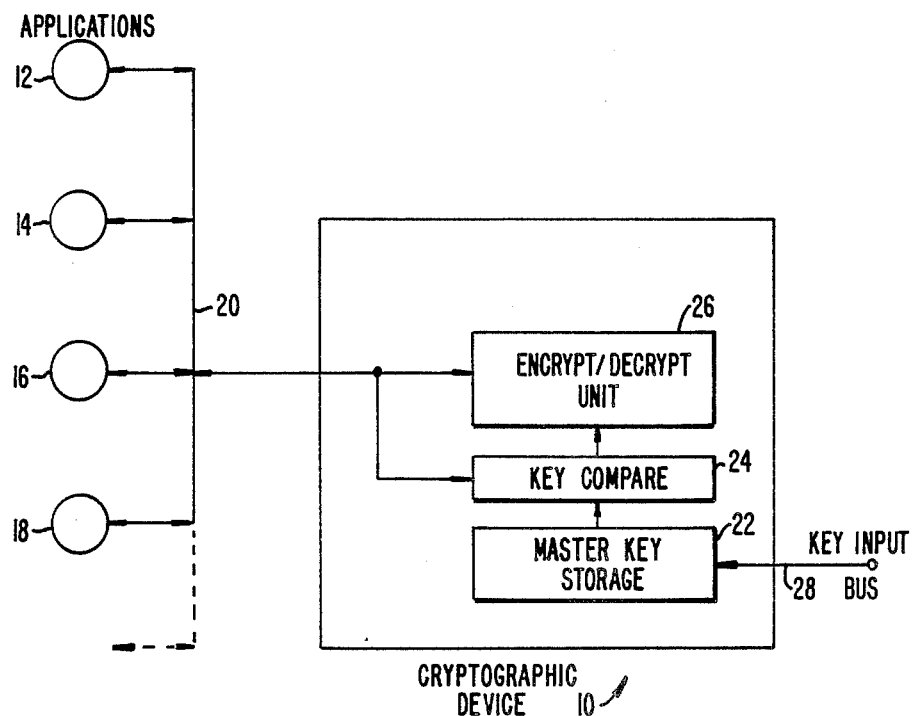
FIG._1.
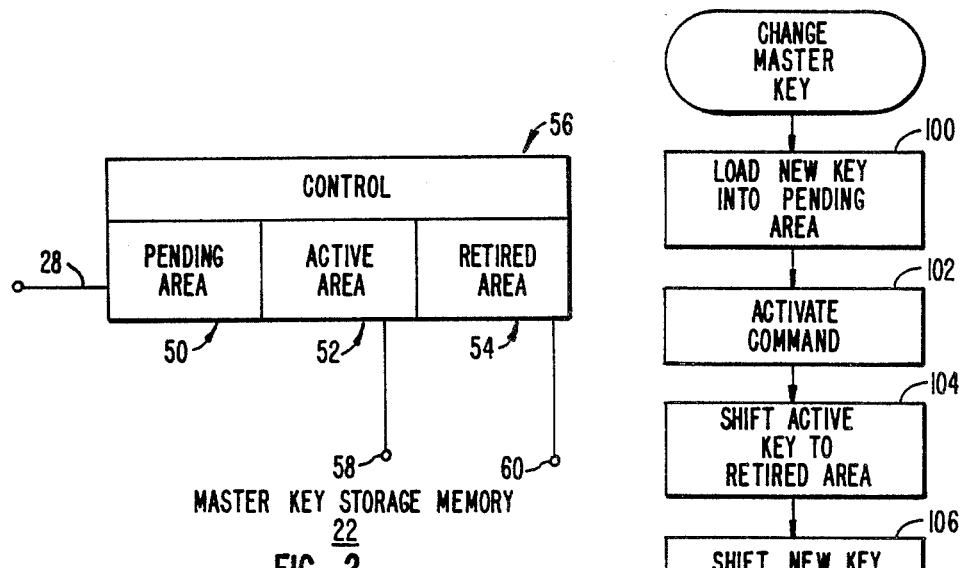
FIG._2.
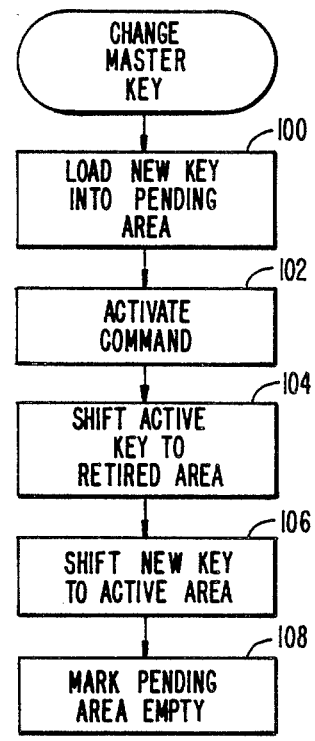
FIG._3.

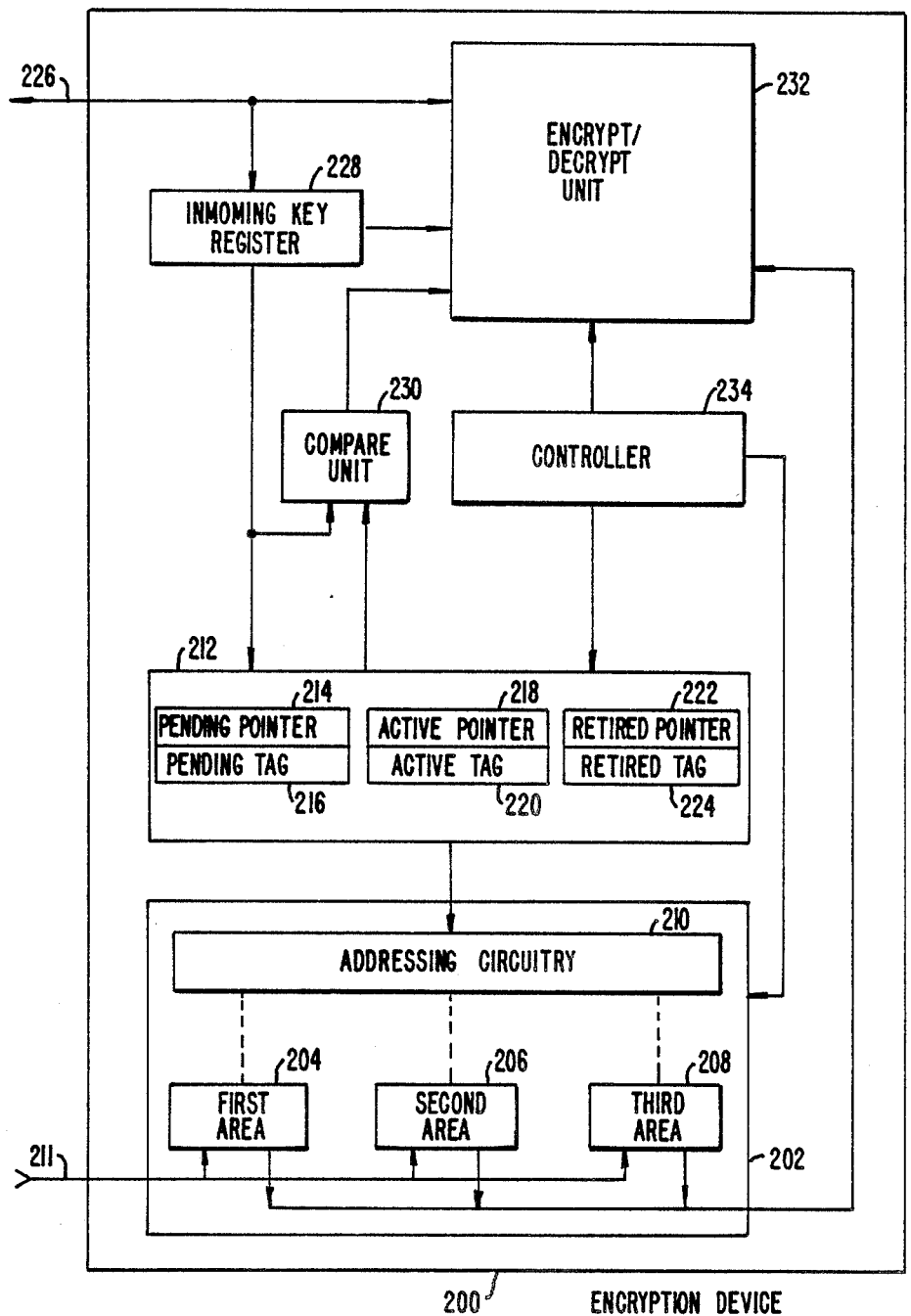
FIG._4.

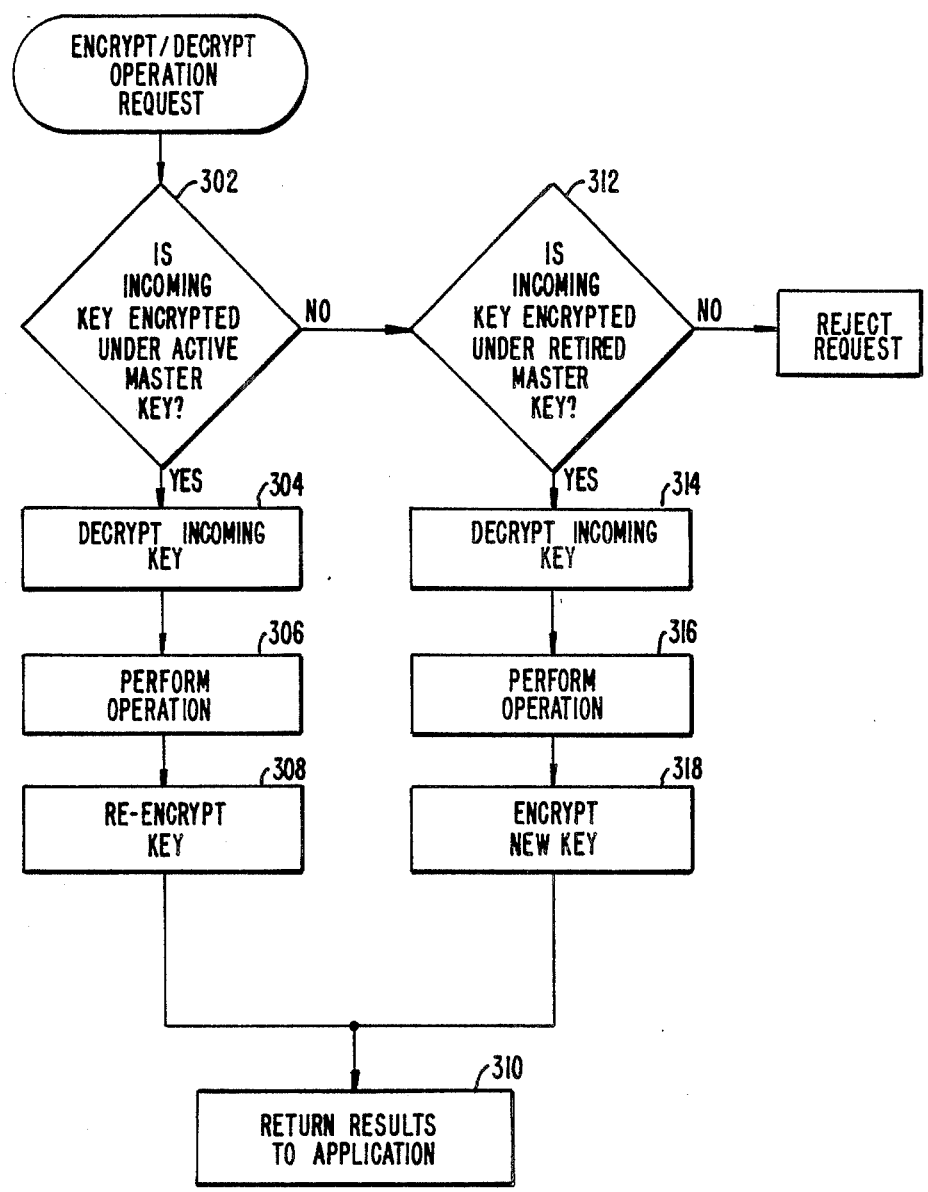
FIG._5.

METHOD AND APPARATUS FOR CHANGING THE MASTER KEY IN A CRYPTOGRAPHIC SYSTEM

BACKGROUND OF THE INVENTION

1. Field of the Invention

The present invention relates to secure data systems having cryptographic keys for encyphering and decyphering data. More particularly the present invention relates to apparatus and methods for altering the cryptographic keys used to encypher and decypher electronic data.

2. The Prior Art

Electronic cryptographic systems are well known. Such systems are used in the encyphering and decyphering of communications, and are also used to encypher and decypher other electronic data which must be transmitted between and among computers and data processing equipment and systems for various purposes when the security of transmitted data is an important consideration. Such applications include banking operations, such as automated teller machines and wire transfer communications, as well as many other important business communications.

Cryptographic systems utilize a master key or keys, which are used in one of several known algorithms to both encrypt and decrypt data. Such keys are usually resident in a control portion of the system. Since the security and integrity of any cryptographic system is dependent on the security of the keys utilized in the system, good practice dictates changing cryptographic master keys every so often to minimize the likelihood that unauthorized persons may be able to "break" the encryption and thus either have access to the data, or have the ability to alter data and create false data.

In a typical secure data processing system, an application presents to the cryptographic device a unique key which has been encrypted by use of a master key resident in a cryptographic device associated with the system, and some data to be encrypted or decrypted. After decryption, if the key is recognized as valid, the application is allowed to gain access to the cryptographic device. The data is appropriately manipulated and the key is re-encrypted using the master key. The data and the re-encrypted key are then returned to the application.

In all prior art cryptographic systems known to the inventors, any master key changes are made by gaining access to the place where the master key is stored, using whatever security measures which have been designed into the system to assure its security, and substituting the new key for the old key. In systems which have distributed keys among a plurality of applications, the key change must be communicated to all system nodes which have a need for local storage and use of a key.

A problem arises, however, in such distributed systems when a given application to which a new master key has not been communicated attempts to communicate with the cryptographic device or other portions of the system. Conventional systems have no provision for recognizing the superceded key as valid and will thus not allow its use. Thus, the application which has not received the update will not be able to handle encrypted communications with the rest of the system until it has received the new key.

The potential problem increases in importance as the use of widely-distributed information networks becomes more prevalent, and, concurrently, as the speed and frequency of encrypted data communications also increases. It is apparent that it would be desirable to provide for recognition of superceded cryptographic keys in distributed cryptographic data systems until they can be changed.

OBJECTS OF THE PRESENT INVENTION

It is an object of the present invention to provide apparatus and methods for changing the master key in a cryptographic data processing system.

It is a further object of the present invention to provide apparatus and methods for allowing the use of a superceded key by a portion of a cryptographic data processing system which has not been provided with an updated key.

Yet another object of the present invention is to provide apparatus and methods which allows a superceded key to be used by an application which has not received an updated key and which communicates a new key to the application.

SUMMARY OF THE INVENTION

Briefly described, the present invention is apparatus and methods for altering a cryptographic key in a cryptographic device. In a preferred embodiment, memory associated with the cryptographic device contains three segments, a pending area for storing a pending key, an active area for storing an active key, and a retired area for storing a retired key.

A pending key is loaded into the pending area of the memory; active and retired keys reside in corresponding areas of memory. In use, a key is presented to the cryptographic device. If the key matches the key stored in the active area of memory, access to the system is granted, the operation is performed, and the data and re-encrypted key are returned to the requesting application. If no match is found, the key in retired area is compared with the key presented. If a match is found, access to the system is granted and the operation is performed. The data is returned to the requesting application, and the new active key, rather than the key in the retired area, is used to re-encrypt the key returned to the application.

BRIEF DESCRIPTION OF THE DRAWINGS

FIG. 1 is a block diagram of a preferred embodiment of the present invention showing also a typical environment within which the invention functions.

FIG. 2 is a block diagram of a preferred embodiment of master key storage memory used in the present invention.

FIG. 3 is a flow diagram of a preferred embodiment of the key changing method of the present invention.

FIG. 4 is a block diagram of a cryptographic device containing a preferred embodiment of the present invention.

FIG. 5 is a flow diagram of a preferred embodiment of the present invention.

DESCRIPTION OF A PREFERRED EMBODIMENT

Referring first to FIG. 1, cryptographic device 10 is shown communicating with applications 12, 14, 16 and 18 via communication line 20. Applications 12-18 may be, for example, automated teller machines for use in banking, as well as any other applications for which this invention is useful. Communication line 20 is shown schematically and may be any form used for this purpose such as direct bus, modem and telephone lines, etc.

Within cryptographic device 10, master cryptographic keys are stored in master key storage memory 22. While FIG. 1 shows master key storage area 22 within cryptographic device 10, those of ordinary skill in the art will understand that it need not be physically so located. All that is necessary is that cryptographic device 10 have access to master key storage memory 22; although for maximum key security, key storage memory 22 will usually be physically located inside of cryptographic device 10.

When it is desired that one of applications 12–18 make use of cryptographic device 10, that application sends a copy of a key it has stored inside of it to cryptographic device 10. In key compare unit 24, the presented key is compared with the active master key stored in master key storage memory 22. If there is a match, the data presented by the application will be operated on by encrypt/decrypt unit 26, the heart of cryptographic device 10, which has been enabled by key compare unit 24. The data and the key are then returned to the application via line 20.

Those of ordinary skill in the art will recognize that the key sent between any of Applications 12–18 and cryptographic device 10 is encrypted so that any unauthorized monitoring of line 20 will not compromise the key. Thus, when key compare unit 24 performs its function, it decrypts the incoming key. The key is then re-encrypted before it is returned to the application.

When a key change is desired, a new key may be entered into master key storage memory 22 via key input bus 28. The manner of the external-to-internal transfer of new keys is a matter of design choice and is beyond the scope of the present invention, but numerous ways of accomplishing this task are available and will readily suggest themselves to those of ordinary skill in the art.

Those of ordinary skill in the art will also appreciate that the algorithm used by and other characteristics of encrypt/decrypt unit 26 are beyond the scope of this invention; however the details and particular methodology utilized are merely a matter of design choice and may be selected from among the schemes known in the prior art.

Referring now to FIG. 2, a presently preferred embodiment will be described. A master key storage memory 22 accessible to the cryptographic device or system contains three areas, pending area 50, active area 52, and retired area 54.

Areas 50, 52, and 54 in master key storage memory 22 are used to store pending, active, and retired keys, respectively. A pending master key is one which is not yet in use, but is intended to replace a master key currently in use. An active master key is one which is currently in use by the cryptographic device or system. A retired master key is a previously active master key which has been replaced. Provision for storage of a retired master key is made to enable use of the cryptographic device or system by applications or devices which have not yet been informed of the most-recent master key change.

A control portion 56 for master key storage memory 22 directs the operations which control access to the master keys. New master keys are loaded into pending area 50 via bus 28, master keys are moved from pending area 50 to active area 52, and master keys are moved from active area 52 to retired area 54, under the direction of control portion 56. The master keys located in active area 52 and retired area 54 may be accessible via busses 58 and 60 respectively.

The details of master key storage memory 22 are beyond the scope of this invention, but are nonetheless well known to those of ordinary skill in the art. Memory 22, including control portion 56 may easily be configured by use of known digital building blocks such as clocked registers, gated memory cells, etc. It is believed by the inventors that register storage would afford a maximum degree of security. Cost of other design considerations, such as system architecture, may, however, compel use of other arrangements, such as addressable memory which has been found to be suitable for this application.

Depending on the hardware configuration of memory 10, the transfer of keys from area 50 to 52 to 54 may be accomplished by serial shifting, parallel loading, or one of other memory and storage manipulation techniques well known in the art. It is the intention of the inventors to avoid limiting the invention to a particular memory configuration.

Referring now to FIG. 3, a flow diagram depicts the process of loading a new master key and changing active master key by moving the new key from the pending area 50 to active area 52 and by moving the old active master key from active area 52 to retired area 54.

The step of loading a new master key into pending area 50 is depicted schematically at 100. As is understood by those of ordinary skill in the art, this step may be accomplished by manual entry, such as by use of a keyboard, or under the control of a computer, microprocessor, or the like. The choice of input method and apparatus used is no part of the present invention and will depend upon the particular system and application. Once a new master key has been entered into pending area 50, it remains there until a command to change master keys is implemented.

A command activates the transition from current to pending key shown schematically at 102. A pending master key stored in pending area 50 (of FIG. 2) is moved to active key area 14; the key to be replaced is moved to retired area 16 from active area 14.

As will be readily understood by those of ordinary skill in the art, the activate command is executed at step 102 at the time the key changed is desired. The activate command may be pre-programmed, i.e., set to occur at a predetermined time under computer control, or may be made manually, for example, when it is thought that a current key may have been or is in jeopardy of being compromised.

Execution of the activate command causes the transfer of the key to be replaced from the active area 52 to retired are 54, as shown schematically at 104. It is understood by those of ordinary skill in the art that the mechanics of this step will necessarily depend upon the particular hardware utilized. For example, in an embodiment where discretely addressable memory locations are employed, this step will consist of reading word comprising the key, the contents of the memory location designated as active area 52 of FIG. 2, and writing that word into the memory location designated as retired area 54 of FIG. 2.

The key to be activated is then moved from pending area 50 to active area 52 of FIG. 2, shown schematically at step 106 in FIG. 3. This step may be accomplished by memory read and write steps just disclosed for retiring the key to be replaced; however the memory read and write addresses will correspond to memory locations designated as pending area 50 and active area 52 in master key storage memory 22 of FIG. 2.

The operations depicted at 104 and 106 of FIG. 3 may, in certain embodiments, be accomplished simultaneously. For example, if master key storage memory 22 is configured as a collection of parallel or series shift register elements, the above-recited transfers will be accomplished by clocking the shift register chains appropriately to transfer all bits in the byte comprising each key to the correct destinations. The decision to configure master key storage memory 22 in a particular manner is a design choice; the preferred configuration will depend on such considerations as system size, available addressable memory and cost factors.

After the key transfers have taken place, an indication that pending area 50 in master key storage memory 22 is empty may optionally be made. Such a step is shown schematically at 108. This step may be implemented by setting a flag in the form of a flip-flop or like device, which, when set, indicates that the pending area 50 of master key storage memory 22 is ready to accept a new pending key.

In another embodiment of the present invention, there is no pending area 50 provided in master key storage memory 22. In this embodiment, key replacement is accomplished by placing the new active key into active area 14 of key storage memory 18 and moving the retired key from active area 14 to retired area 16.

Those of ordinary skill in the art will readily appreciate that the moving of the keys themselves from one area to another area of memory 10 is not necessary, and that the function of the present invention may be accomplished by equivalent means.

In a presently-preferred embodiment, master key storage memory 22 of FIG. 2 is shown in greater detail with reference to FIG. 4. In this embodiment, key changes are implemented by changing a vector or pointer to the areas in memory where the pending, active, and retired keys are stored. The contents of the memory areas are not altered until a new pending key is entered by "writing over" the contents of the memory area corresponding to the key in the retired area.

In the apparatus and method of the embodiment of FIG. 4, each key has associated with it a version number. In practice, each key version will preferably be assigned a version number at the time of its creation. For security reasons these numbers preferably consist of one member of an extremely large set of monotonic non-repetitive numbers, although those skilled in the art will be able to select a numbering scheme as a matter of design choice taking into consideration the relative degree of security desired.

The version number for each key will be transmitted back and forth between the application and cryptographic device 10 along with the key as a "tag" bit field. This tag field associated with the key is used in the present invention as is described now with reference to the embodiment of FIG. 4.

Cryptographic device 200 contains master key storage memory 202, which itself contains a first area 204, a second area 206 and a third area 208. Areas 204, 206 and 208 are used to store pending, active, and retired master keys. Addressing circuitry 210 is used to gain access to areas 204, 206, and 208. Input line 211 is provided for the leading of new pending keys into master key storage memory 202. Master key storage memory 202, including its addressing circuitry 210, may be chosen from among known digital building blocks; the particular type used is a matter of design choice.

The addressing of master key storage memory 202 is accomplished by presenting entries from a table 212 to addressing circuitry 210. Table 212 contains three sets of fixed locations which contain a pending pointer (shown at fixed location 214) an active pointer (shown at fixed location 218) and a retired pointer (shown at fixed location 222). Pointers 214, 218 and 222 indicate which of areas 204, 206 and 208 contain pending, active and retired master keys. The entries for the pending, active, and retired pointers are the addresses of areas 204, 206 and 208. Because of the nature of the data manipulations which take place in table 212, this table may be configured as a three stage shift register having parallel outputs for each stage, although those of ordinary skill in the art will readily recognize how other configurations could easily be used.

Each pointer has associated with it another entry in table 212. The pending pointer has associated with it pending tag entry (shown at fixed location 216); the active pointer has associated with it active tag entry (shown at fixed location 220); and the retired pointer has associated with it retired tag entry (shown at fixed location 224). These entries are used when an application presents a key and data to be manipulated. This process is explained with reference to FIGS. 4 and 5.

An application presents its key, along with its tag field number, along line 226 to cryptographic device 200. The key and its tag are stored in incoming key register 228. The tag field number portion of the incoming key is compared with the active tag entry located in fixed location 220 in table 212 by compare unit 230. This is shown at 302 of FIG. 5.

If there is a match, the key portion of the incoming key is placed from incoming key register 228 into encrypt/decrypt unit 232, where it is decrypted using the key stored in the area in master key storage memory 202 pointed to by active pointer at fixed location 218 in table 212. This is shown at 304 of FIG. 5.

The decrypted key is used to manipulate the data sent from the application to encrypt/decrypt unit 232 via line 226. The key is then re-encrypted and sent back to the application along with the manipulated data. These operations are shown at 306, 308 and 310 of FIG. 5.

If there is no match, the tag field number portion is compared in compare unit 230 with the retired tag in fixed location 224 in table 212. This is shown at 312 of FIG. 5. If there is a match, the key is decrypted using the key in master key storage memory 202 pointed to by the retired pointer in fixed location 222 in table 212. This is shown at 314 of FIG. 5.

The data is next manipulated in encrypt/decrypt unit 232 using the decrypted key. This is shown at 316 of FIG. 5.

Upon completion of the data manipulation using the retired key, the active key is accessed from master key storage memory 202 using the active pointer at fixed location 218 in table 212. The decrypted active key is then re-encrypted using the active key in encrypt/decrypt unit 232 and returned, with the manipulated data, to the application via line 226. This is shown at 316 and 318 of FIG. 5

When a key change is desired, the values stored in the tables are merely rotated so that the pointers indicate the new values. For instance, if the pending key was stored in first area 204, the active key in second area 206 and the retired key in third area 208 of master key storage memory 202, then pending pointer at fixed location 214 points to first area 202, active pointer at fixed location 218 points to second area 204 and retired pointer at fixed location 222 points to third area 208.

For a key change, all that needs to be done is to move the entry which was the active pointer from fixed location 218 in table 212 to the fixed location 222, move the entry which was the retired pointer from fixed location 222 to fixed location 214 and move the entry which was the pending pointer from fixed location 214 to fixed location 218. The tag entries are similarly moved, i.e., the entry which was the active tag from fixed location 220 to fixed location to fixed area 224, the entry which was the retired tag from fixed location 224 to fixed location 216 and the entry which was the pending tag from fixed location 216 to fixed location 220. After these operations, the contents of the area in memory pointed to by fixed location 214 may be zeroed or another indication, such as setting a flag flip-flop or similar device, may be used to indicate that there is no pending key.

When a new pending key is to be placed in encryption device 200, it is placed in the area pointed to by the contents of fixed location 214. The tag number assigned to the new key is inserted into fixed location 216.

All of the operations of cryptographic device 200 are performed under the direction of controller 234 which may be, for example, a microprocessor programmed to perform the operations disclosed in FIGS. 3 and 5 and the accompanying written description.

The foregoing description will make fabrication and operation of the present invention clear to those of ordinary skill in the art. The particular circuit configurations used will be a matter of design choice. It is the intention of the inventors that the scope of the present invention be limited solely by the appended claims.

What is claimed is:

1. Apparatus for changing a key in a cryptographic device, including:

key storage memory means having an active key storage area for storing a current cryptographic key and a retired key storage area for storing a superceded cryptographic key;

means for loading a new cryptographic key into said active key storage area in response to a key change command;

means for moving said current cryptographic key from said active key storage area to said retired key storage area in response to said key change command.

2. Apparatus for changing a key in a cryptographic device, including:

key storage memory means having a pending key storage area, an active key storage area for storing a current cryptographic key and a retired key storage area for storing a superceded cryptographic key;

means for loading a pending cryptographic key into said pending key storage area;

means for moving said pending cryptographic key from said pending key storage area to said active key storage area in response to a key change command;

means for moving said current cryptographic key from said active key area to said retired key storage area in response to said key change command.

3. The apparatus of claim 2 further including means responsive to said key change command for indicating that said pending key storage area is empty.

4. A method for changing a key in a cryptographic device having a key storage memory associated therewith, said memory containing an active key storage area, a pending key storage area and a retired key storage area, including the steps of:

Entering a first key which is to be activated into said pending key storage area;

Moving a second key which is to be retired from said active key storage area to said retired key storage area;

Moving said first key which is to be activated from said pending key storage area to said active key storage area.

5. The method of claim 4 further including the step of placing an indication in a location in said memory indicating that said pending key storage area is empty.

6. The method of claim 4 further including the step of placing a third key which is later to be activated in said pending key storage area.

* * * * *